United States Patent
Heiss et al.

(10) Patent No.: US 8,260,756 B2
(45) Date of Patent: Sep. 4, 2012

(54) COMPREHENSIVE COORDINATED ELECTRONIC DOCUMENT SYSTEM

(75) Inventors: Eric R. Heiss, Kennett Square, PA (US);
Scott Huie, Charlotte, NC (US);
Dariane Katinka Hunt, Concord, MA (US)

(73) Assignee: Bank of America Corporation, Charlotte, NC (US)

( * ) Notice: Subject to any disclaimer, the term of this patent is extended or adjusted under 35 U.S.C. 154(b) by 524 days.

(21) Appl. No.: 12/363,270

(22) Filed: Jan. 30, 2009

(65) Prior Publication Data
US 2010/0198780 A1 Aug. 5, 2010

(51) Int. Cl.
G06F 17/00 (2006.01)
G06F 17/30 (2006.01)

(52) U.S. Cl. .......... 707/694; 707/802
(58) Field of Classification Search .......... 707/694, 707/781, 783, 999.1, 999.2, 802, 811, 999.201; 705/7.11, 320, 323
See application file for complete search history.

(56) References Cited

U.S. PATENT DOCUMENTS

| | | | |
|---|---|---|---|
| 6,505,031 B1 | 1/2003 | Slider et al. | |
| 7,822,796 B2 * | 10/2010 | Lambert et al. | 705/29 |
| 7,958,147 B1 * | 6/2011 | Turner et al. | 707/783 |
| 2004/0044949 A1 | 3/2004 | Rowe | |
| 2004/0148285 A1 * | 7/2004 | Hurd et al. | 707/9 |
| 2009/0099965 A1 * | 4/2009 | Grant, IV | 705/41 |

FOREIGN PATENT DOCUMENTS

| | | |
|---|---|---|
| WO | WO 2007/092722 A2 | 8/2007 |
| WO | WO 2007/139958 A2 | 12/2007 |

OTHER PUBLICATIONS

Extended European Search Report mailed Apr. 21, 2010 for European Application No. EP 10 25 0155.
Extended European Search Report mailed Jul. 8, 2010 for European Application No. EP 10 25 0143.

* cited by examiner

*Primary Examiner* — Marc Filipczyk
(74) *Attorney, Agent, or Firm* — Michael A. Springs; Moore & Van Allen PLLC; Andrew D. Gerschutz

(57) ABSTRACT

Embodiments of the present invention provide a method and system for providing a comprehensive coordinated electronic document functionality by storing and providing access to at least one non-personalized electronic document and at least one personalized document, enabling at least one action with regard to the non-personalized document and the personalized document, and creating a record of the at least one action taken. The invention can be implemented via a stand-alone computing system or such a system interconnected with other platforms or data stores by a network, such as a corporate intranet, a local area network, or the internet.

23 Claims, 2 Drawing Sheets

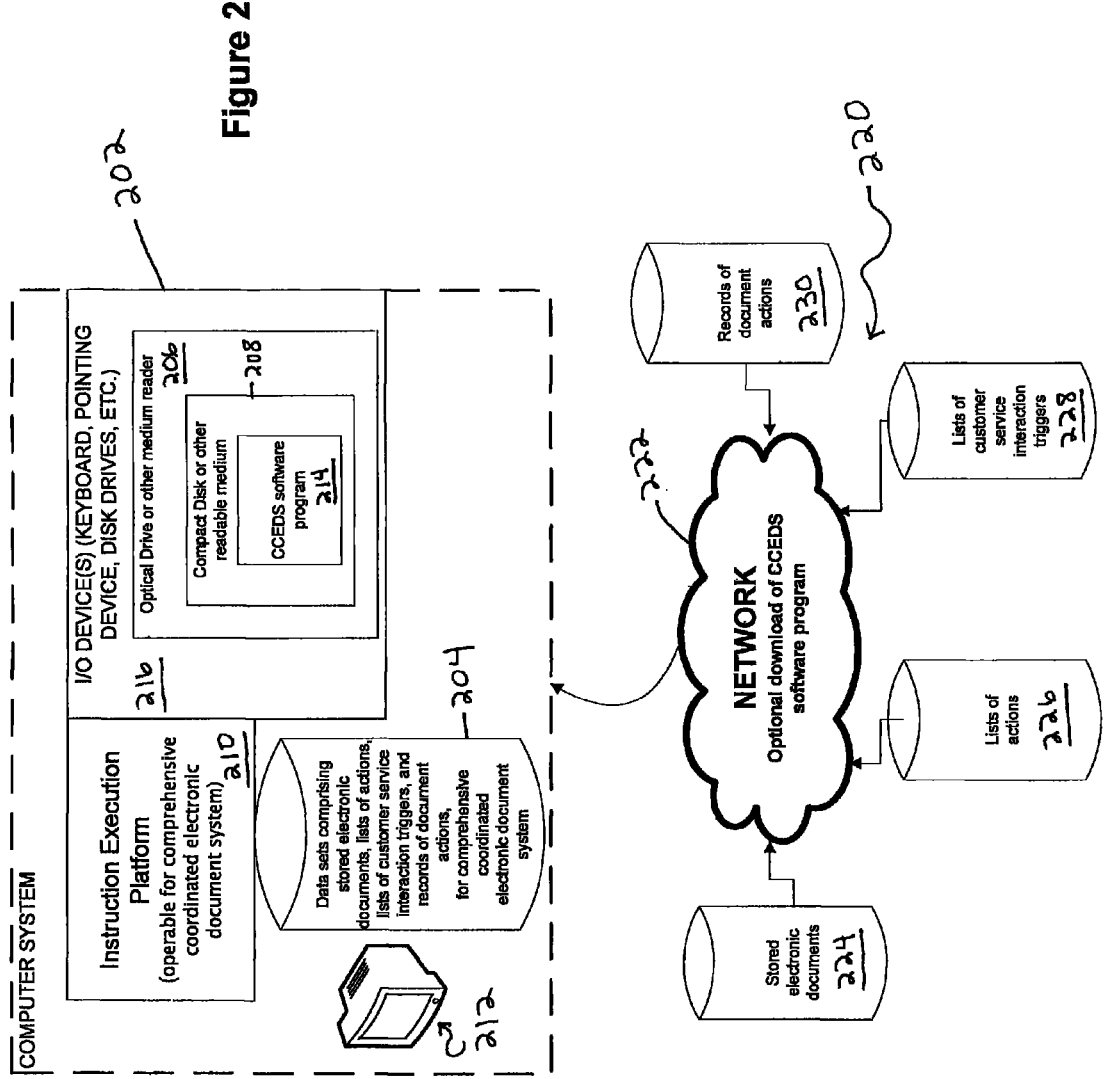

COMPREHENSIVE COORDINATED ELECTRONIC DOCUMENT SYSTEM

CROSS-REFERENCE TO RELATED APPLICATION

At least some of what is disclosed in this application is also disclosed in U.S. patent application Ser. No. 12/363,367, entitled, "Comprehensive Coordinated Communication System," which was filed in even date herewith, is commonly assigned, and is incorporated herein by reference.

BACKGROUND

The financial industry has traditionally been paper-intensive. Account applications, monthly and/or quarterly account statements, loan applications, and other documentation of transactions is typically provided to the customer and kept by the financial institution. Such a glut of paperwork presents an organizational challenge for both the financial institution and the customer. Deciding how to store and organize such paperwork presents a further challenge due to the fact that much of the information contained therein is of a confidential nature. In today's highly electronic world, the array of disparate technologies available for interacting with customers is expanding rapidly, and each type of technology offers advantages and disadvantages. While there have been some attempts to store documents in an electronic fashion, such technologies have offered limited abilities to access and utilize the stored documents.

SUMMARY

Embodiments of the present invention provide a method and system of providing a comprehensive coordinated electronic document system (CCEDS). Embodiments of the present invention enable electronic storage and access to documents, wherein electronic storage and access is provided to non-personalized and/or personalized electronic documents. At least one action is enabled with regard to the electronic documents, and any action that is taken with regard to an electronic document is recorded. In some embodiments, a non-personalized electronic document on which at least one action is taken becomes a personalized electronic document.

In some embodiments, the CCEDS comprises a secure environment in which at least some of the documents are stored and accessed.

In some embodiments, the at least one non-personalized electronic document comprises blank forms and informational documents. In some embodiments, the blank forms and informational documents comprise documents in the categories of new account applications, transfers and payments, insurance documents, student center documents, tax and legal documents, and disclosure statements and agreements.

In at least some embodiments, the at least one personalized electronic document comprises documents in the categories of personal checking, personal savings, joint checking, mortgage account, personal credit card, corporate credit card, miscellaneous bank mail, and informational documents.

In at least some embodiments, the at least one personalized electronic document is selected from the group consisting of an account statement, a completed new account application, a completed insurance form, a completed student center form, a completed tax document, a completed legal document, a completed disclosure statement, and a completed agreement.

In some embodiments, the at least one action comprises completing a blank form, submitting a completed form, performing a document search, adding notes to a document, saving a document, emailing a document, viewing a personalized document, or initiating a customer service interaction regarding a document.

In at least some embodiments, initiation of a customer service interaction is prompted by a trigger. In some embodiments, the trigger is request-specific or action-specific.

In at least some embodiments, the record created comprises a link to a customer service history containing records of interactions and transactions pertaining to the electronic document.

In at least some embodiments, performing a document search comprises at least one of performing the search based on the text of the document, the title of the document or the file name of the document, and performing the search based on key words assigned to the document.

In some embodiments, the invention is implemented via either a stand-alone instruction execution platform or such a platform interconnected with other platforms or data stores by a network, such as a corporate intranet, a local area network, or the internet. A computer program product or computer program products contain computer programs with various instructions to cause the hardware to carry out, at least in part, the methods and processes of the invention. Data sets may include stored electronic documents, lists of actions, lists of action triggers correlated with actions, and records of document actions. Any comparisons may be made using the data sets. Data sets may be stored locally or accessed over a network.

BRIEF DESCRIPTION OF THE DRAWINGS

FIG. 2 is a system block diagram according to example embodiments of the invention.

DETAILED DESCRIPTION OF THE INVENTION

Figure 1:
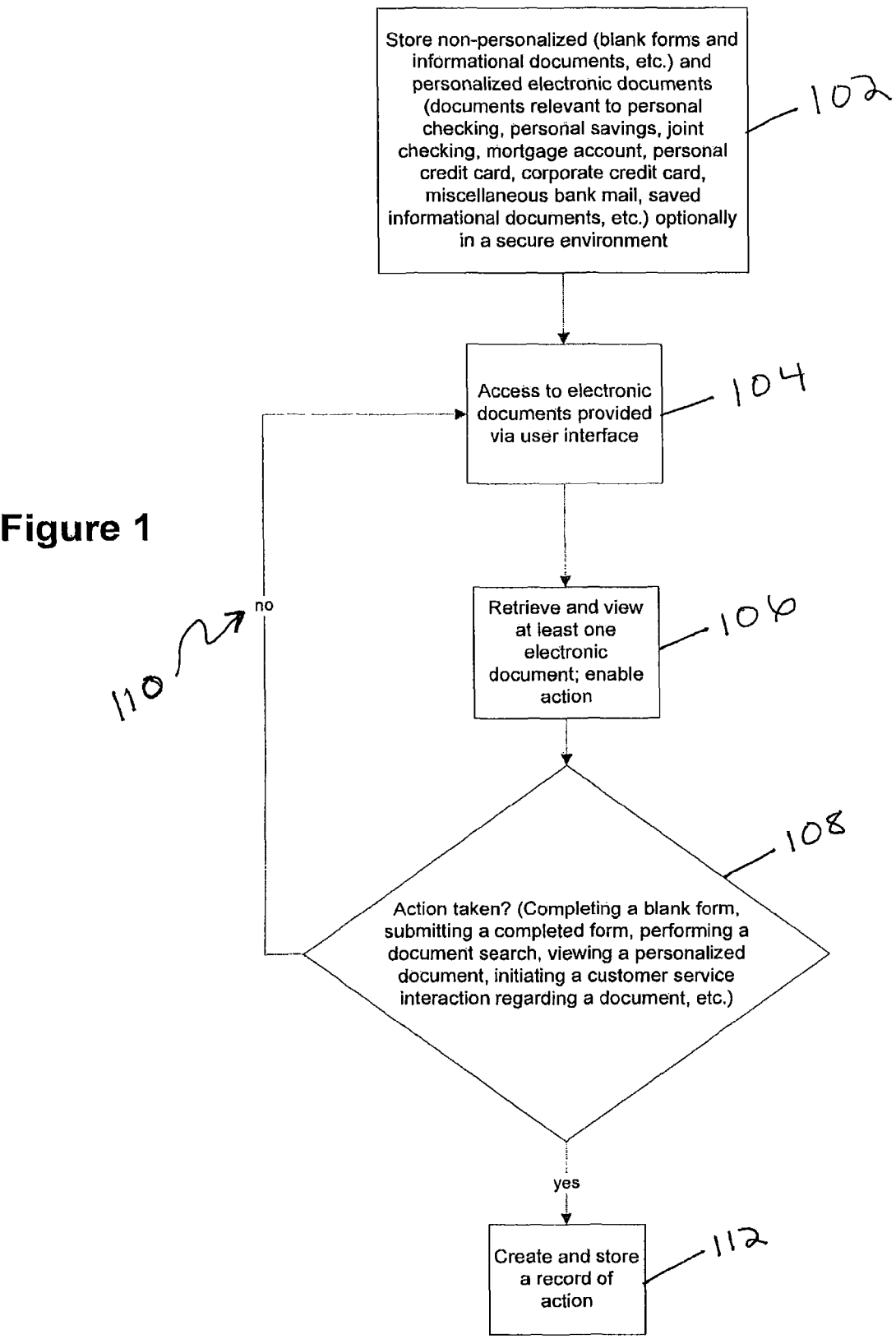
FIG. 1 is a flow chart that illustrates a method of using a comprehensive coordinated electronic document system (CCEDS) according to example embodiments of the invention.

The present invention will now be described in terms of specific exemplary embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The following description is based on an exemplary implementation of an embodiment of the invention in a computer software tool for use in providing a comprehensive coordinated electronic document system (CCEDS) that is useful for a financial institution and a financial institution customer. A CCEDS is a system and computer program product that enables electronic storage and access to documents, wherein electronic storage and access is provided to non-personalized and personalized electronic documents. At least one action is enabled with regard to the electronic documents, and any action that is taken with regard to an electronic document is recorded. In some embodiments, a non-personalized electronic document on which at least one action is taken becomes a personalized electronic document. Specifically, a CCEDS designed for use in a financial institution is described below as an exemplary embodiment of the invention.

The following description is based on an exemplary implementation of an embodiment of the invention in a financial institution, but it is understood that the present invention could be useful in many different types of businesses and the example herein is not intended to limit the use of the invention to any particular industry. The invention described herein is particularly well suited to use in any business that serves customers. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

The CCEDS provides an adaptable and flexible system of electronic document storage, retrieval, and handling. The CCEDS provides users with the capability to store, retrieve and manipulate documents in an electronic environment. It is important to note that a user of a CCEDS may be either employees of a business or customers of a business. In the present example of a CCEDS in a financial institution, the CCEDS may be used by financial institution employees to provide customer service, and the CCEDS may be used by customers to self-serve and/or to seek assistance from financial institution employees. In some embodiments, the CCEDS provides a secure environment so that the user can manipulate documents containing sensitive information, giving the user the ability to manage and store all types of documents, including those containing confidential information, in a single online location.

The CCEDS provides access to both non-personalized electronic documents and personalized electronic documents. Non-personalized documents include documents such as blank forms and informational documents. Non-personalized documents usually, by their nature, do not contain private or confidential information and therefore do not require security measures. Personalized documents, however, may include documents, such as account statements or completed forms, which contain confidential information.

In some embodiments, access to the CCEDS is not in a secure environment. For example, in some embodiments, it may not be necessary to provide any type of security around non-personalized documents such as blank forms and informational documents. In such cases, an entry portal may be provided on a financial institution's webpage that allows a user to access the documents without logging into a secure system.

In some embodiments, the CCEDS provides an entry portal that allows the user to securely log into the system. From here, the user may have a number of options. The user may have access to non-personalized electronic documents and personalized electronic documents. Further, the user has access to various actions with regard to either non-personalized or personalized documents. Any actions the user undertakes will be recorded, and the record of the action will be stored in the CCEDS. In some embodiments, undertaking an action with regard to a non-personalized document converts the document to a personalized document.

The term "action" as used herein refers to an activity the user undertakes with regard to a document. The precise definition of "action" in the CCEDS will be determined by those of skill in the art who design a particular CCEDS. The definition of the term "action" as used in the CCEDS determines when a non-personalized document is converted to a personalized document, and also determines when a record is to be created of an activity undertaken by a user.

For example, the definition of an "action" may include, but is not limited to, completing a blank form, submitting a completed form, performing a document search, adding notes to a document, saving a document, emailing a document, viewing a personalized document or initiating a customer service interaction regarding a document. Examples of other activities that may be defined as "actions" in some embodiments include printing a document, flagging a document for future reference, or reorganizing documents (i.e., grouping into different categories). By contrast, it may be decided in some embodiments that simply accessing or viewing a non-personalized document is not to be considered an action as that term is used herein. Those of skill in the art will understand that the precise definition of "action" may differ and will still fall within the scope of the present invention.

An action is "enabled" by the CCEDS if the system contains all of the necessary components to support an activity undertaken by a user. Enablement refers to, for example, the contents and capabilities of the computer program product, the databases, the servers, and any other parts of the system, including the overall architecture. It is understood by those of skill in the art that the specific arrangement of the components of a system may be structured in different ways and yet will still fall within the scope of the present invention.

In some embodiments, the CCEDS enables, or supports, a number of actions that can be undertaken by a user. Such actions, as noted above, may include completing a blank form, submitting a completed form, performing a document search, adding notes to a document, saving a document, emailing a document, viewing a personalized document or initiating a customer service interaction regarding a document. In some embodiments, simply retrieving and viewing a non-personalized document is not considered to be an action. Note that a user of the CCEDS may be either a customer of the financial institution or an employee of the financial institution.

The CCEDS creates a record of actions taken by a user. As noted above, the precise definition given to the term "action" determines when an activity is recorded. Once a record has been created, it is stored in the CCEDS and can be retrieved and viewed by a user. As used herein, the term "history" refers to all of the available records that fall within a specifically defined category. For example, it may be useful to retrieve and view a history of all customer service interactions pertaining to a specific document. In another example, it may be useful to retrieve and view a history of all customer service interactions pertaining to all of a particular customer's personalized documents. Other uses of the term "history" could be defined and used within the CCEDS.

The CCEDS is a highly useful system for supporting interactions between a financial institution and its customers. The CCEDS provides all of its functions to both (employees of) the financial institution and to the customer, thus enhancing the ability of the financial institution to meet customer needs, and also maximizing the efficiency of interactions between the financial institution and the customer.

In some embodiments, the CCEDS provides links between specific electronic documents and customer service representatives who are specialists in the subject matter addressed by the document. The term "customer service representative" is not meant to be limiting. Any person associated with an enterprise, such as a financial institution, who performs functions involving the provision of service to a customer can be considered to be a "customer service representative" for purposes of implementing an embodiment of the invention, irrespective of the person's actual title as an associate of the enterprise. The CCEDS is available to any customer service representative at the financial institution, thus providing immediate access to the customer's documents and information. This access serves to greatly enhance the financial institution's ability to provide excellence in customer service.

When describing the exemplary embodiment presented hereinbelow, the financial institution referred to is a bank. Those of skill in the art will understand that this is not meant to be limiting and that the embodiment as described can be applied at any financial institution.

For many years, customers have dealt with their banking documentation needs by using paper. For example, the customer contacted the bank and expressed interest in a subject area, and the bank then provided informational documents and/or blank forms. This involved the physical exchange of tangible paper items. As such, the customer was required to go to a banking center in person, or the bank mailed the papers to the customer (or otherwise shipped them by use of a document carrier). Once a customer filled out and completed the forms, the forms had to be physically returned to the bank, again either in person or by carrier. Such a process was tedious and time-consuming. Furthermore, once the paperwork was completed, both the customer and the bank had to decide how and where to store the completed paperwork.

These traditionally used channels of handling paperwork create a less than ideal situation, as the bank may not be able to respond to the customer's specific concerns in a timely manner, and there are many demands on the customer. Clearly, it is desirable to reduce customer effort and wait time, improve responsiveness to customer needs, and overall, improve customer satisfaction with the banking experience. This can be achieved by using a comprehensive coordinated electronic document system (CCEDS) such as that presented herein.

In summary, and as an exemplary embodiment, a CCEDS designed for use in a bank is described in more detail as follows. The CCEDS system and computer program product of the exemplary embodiment enables bank customers to store, retrieve, and manipulate electronic documents by supplying a single-source customer access to a plurality of electronic documents. The CCEDS improves the customer-bank interaction experience for both the customer and the bank by, among other things, providing a tool that enables either the customer or the bank to access documents through a system that enables timely actions and responses.

Note that the bank may choose to provide access to documents beyond those that would traditionally be considered to be "bank" documents. Any electronic documents could be provided by the bank, and those of skill in the art understand that the bank may determine that providing access to many different types of documents could be useful to its customers. The types of documents offered within the CCEDS is not meant to be limiting, and expansion of the number and types of specific documents to which the bank supplies access still falls within the scope of the presently described invention.

In an exemplary embodiment, the CCEDS supplies a single-source customer interface to the bank's electronic documents. In some embodiments, the interface will be offered via an internet website. In some embodiments, documents will be accessible on the publicly available website and will not be in a protected secure environment. In some embodiments, once the customer has accessed the bank's website, he or she will enter a secure environment in which it is safe to store and manipulate confidential and private information.

FIG. 1 is a flow chart depicting an overview of the CCEDS in at least some embodiments. Storage of non-personalized and personalized electronic documents is provided 102. Access to the stored 0electronic documents is provided via a user interface 104. The user interface may be, for example, an internet website created by the bank and visited by a bank customer. In some embodiments, the website will be in a secure environment to facilitate the free flow of sensitive information.

The user retrieves and views at least one electronic document 106. The user can retrieve non-personalized documents and/or personalized documents, depending on the architecture of the CCEDS, and on the user's website location in terms of whether the user is on a publicly accessible website or logged into a secure environment.

In some embodiments, if the user is on a publicly available website, no "actions" as the term is used herein are accessible to him or her. If the user is on a publicly available website, the user is only allowed to retrieve and view non-personalized electronic documents. However, this may be helpful for users who are simply trying to learn more about a particular topic.

In some embodiments, if the user is logged into a secure environment, the user will have access to both personalized and non-personalized electronic documents, and actions will be enabled. The available actions may include, but are not limited to, filling in or completing a blank form, submitting a completed form, performing a document search, adding notes to a document, emailing a document, viewing a personalized document, saving a document, or initiating a customer service interaction regarding a document. Note that retrieving a non-personalized document and then performing an action with regard to that document converts the document to a personalized document.

Once the user has retrieved a document, the user decides whether to take an action with regard to the document 108. As noted above, the ability to take an action is dictated at least in part by whether or not the user is logged into a secure environment. If the user does not take an action 110, the user returns to the user interface 104, where he or she can retrieve another document. If the user does take an action with regard to the retrieved document, a record of the action is created and stored 112.

The CCEDS creates a record of each action taken with a document. As used herein, the term "record" refers to any log, any notes, or recordation of any kind created with regard to an action. It is understood that the technology used to capture the record of the action is irrelevant. A record may contain details pertinent to the action such as date, time, and parties involved. A record may further contain details of the substantive nature of the action. A record, as captured within the CCEDS, provides highly useful information. While taking an action with an electronic document is what prompts the creation of a record within the CCEDS, the record itself is correlated with various things such as the action taken, a particular document, a customer, a date, a customer service communication interaction associated with a particular document, or any other information field provided as part of the record. These correlations allow comparisons and retrievals of records by acting as searchable terms or fields, thus allowing full categories of records to be retrieved as histories and enabling sorting of records by each correlation. For example, records may be sorted into action histories, document histories, customer histories, date histories, etc.

A record may be, for example, but not limited to, a record of a communication interaction between the bank and a customer regarding a particular document. Examples of such records include a transcript of an instant messaging conversation, a copy of an email, an audio-recording of a telephone conversation, a typed transcript of a telephone conversation, notes made to capture the substance of a telephone conversation, a calendar entry for an in-person appointment, or notes made to capture the substance of an in-person interview.

A more complete record of an action pertaining to a particular document may additionally include correlation with any other documents filled out or submitted in association with the particular document, a user's browsing history on the bank's website that is somehow correlated with the particular document, or any other traceable footprint made as the action transpired. One of skill in the art recognizes that any means of capturing activities that contributed to or are associated with an action is encompassed by the scope of the present invention and the means by which the record is captured is not meant to limit the scope of the invention.

In the exemplary embodiment presented herein, the first party is a bank and the second party is a bank customer. Within the bank's secure internet environment, the customer will be able to view all non-personalized and personalized electronic documents. When the customer enters the CCEDS, the portal page displays a list of all available electronic documents. Available electronic documents at a bank may include, but are not limited to, account statements, letters, notifications and notices, applications, disclosures, tax documents, privacy policies, terms and conditions, customer agreements, and fulfillment documents.

In one example, the customer selects from a display of categories including non-personalized documents such as New Account Applications, Insurance Documents, Tax and Legal Documents, Student Center Documents, and Disclosure Statements and Agreements. The customer selects from a display of categories including personalized documents such as Transfers and Payments, and a category called "Your Documents" which contains any documents the customer has saved while logged securely into his or her online access account.

In this example, the documents are displayed as circles, wherein a single circle represents each category. A bigger circle indicates a more frequently selected category. The customer may be able to select, from a dropdown menu, to size the circles based on other category attributes, such as a display wherein the bigger the circle, the larger the number of documents contained in the category. On the same interface page, the customer can also use the "Find" search function. The customer can select, again from a dropdown menu, whether to search based on key words assigned to and associated with a document or whether to search the text and/or titles and/or file names of the documents. Key words can be assigned by either party, in this case by the bank or the customer. Finally, the display also includes a list of the most requested documents. This is offered as a convenience for the customer by enabling access to the most requested documents with a single click, rather than forcing the customer to use multiple clicks to delve into a category and find a specific document.

If the customer clicks on the Your Documents category circle, a new webpage interface is displayed. The Your Documents webpage also presents each category of documents as a circle, wherein the size of the circles represents attributes of the category as described above. The customer selects from a display of categories such as, but not limited to, Personal Checking, Personal Savings, Joint Checking, Mortgage Account, Personal Credit Card, Corporate Credit Card, Your Saved Documents, and Miscellaneous Bank Mail. These categories are exemplary, and it is to be expected that different customers will have different categories within their personalized documents, as each customer's needs are different. In some embodiments, each category circle contains a numerical indication of the overall documents in the category, and also a numerical indication of the number of new documents in the category. By clicking within a given category circle, the customer may be presented with sub-categories that allow for navigation to a specific document.

Also available to the customer within the Your Documents web interface is a Quick Find feature that serves to coordinate all of the documents in the customer's personalized documents space. The Quick Find feature allows the customer to review all unread documents, review all tagged documents, find a specific document, or browse all documents within the customer's personalized documents space.

The Your Documents interface also provides a To Do feature. The To Do feature lists items that the customer needs to address, some of which are of a time-sensitive nature. In one example, items on the To Do list may include things like a loan application. Each entry is dated and may contain other information, such as number of pages in the document, or if it is an application or other form that needs to be completed, the percentage of the document that has been completed may be displayed.

If the customer selects the option to review all unread documents, a new webpage interface is displayed. The documents are displayed on the new webpage so that they look the same as the actual paper document would look, and are presented in a somewhat overlapping fashion so that all unread documents can be seen as present. In some embodiments, this may be an actual image of a paper document in a file format such as a portable document format (pdf).

To review the unread documents, the customer simply clicks on the document he or she wants to read, and it enlarges to enable customer inspection of the full document. Once a document is selected, the CCEDS also provides an input feature wherein the customer can make notes about the document, or if the document is a form, the customer can complete the form. The input feature also displays other information relevant to the document. The relevant information includes, for example, the document name, which of the customer's accounts it pertains to, the date the document was sent (or received or saved), the number of pages, the format of the electronic document (a ".doc", a ".pdf", etc.), whether or not the document has been tagged by the customer for further attention, customer notes, and records of communication regarding the document (such as chat history and email history).

The webpage display for reviewing all unread documents also contains a feature to find other documents. This option contains a list offering the same options as the Quick Find list described above (review all unread documents, review all tagged documents, find a specific document, or browse all documents within the customer's personalized documents space). Additionally, the feature for finding other documents on this page also includes the option to view documents by customer account.

A customer may delve as deeply as he or she wishes into any of the categories of documents, until finally reaching a full view of an individual document. For example, if a customer on the All Documents page clicks on the Student Center circle (a non-personalized documents category), the CCEDS will display circles representing the various categories of documents offered in the Student Center. In one example, there is a Stafford Loans category and a PLUS loans category.

Note that once a customer has delved into a category with one click, then it also becomes possible to "back out" of the category. The CCEDS allows the user to navigate in and out of categories and specific documents. In other words, all of the category circles are displayed in one large circle. Clicking on a category circle will open up, or expand, the clicked circle and offer the customer more detail regarding the documents in that category. Clicking on the big overall circle will allow the customer to back out of the category and move back to a higher level view of all of the document categories. This occurs in a stepwise fashion, so a single click changes the level of abstraction displayed to the customer by only one level.

In one example, there is a Stafford Loans category and a PLUS loans category within the Student Center category, each represented by a smaller circle inside the larger overall Student Center circle. In some embodiments, the category circles will have a numerical representation of the number of documents contained in the category, as described above. In other embodiments, or at different levels of abstraction within the system, the category circles may have an iconic representation of each document in the category.

In the present example, there is iconic representation of each of four documents within the PLUS loans category circle, and each of three documents in the Stafford Loans category circle. There is also a listing of all of the documents in each category at the right side of the display, with brief information about the substance of the document, information as to the document file format (such as a pdf or an online form), and with options to View, Save to Your Documents, or Learn More about each document. The View feature launches the document in a new window. The Save to Your Documents feature operates as a bookmark so users can add documents to their "My Documents" tab for easy reference in the future or save the document to their local computer. The Learn More feature opens a new page in a new window on the website with more information about that document. And finally, the Find feature as described above is again displayed in the upper right corner of the webpage. Users may also print any document.

If the customer clicks on the PLUS Loans circle, a new webpage interface is displayed. The iconic displays of the four documents within the PLUS Loans category are enlarged, and each contains a name. All documents are listed on the right side of the page, as described above for the Student Center category. The Find feature is displayed in the upper right corner.

In some embodiments, "rollovers" may be provided on all document iconic displays to provide more information to the customer about what is in the document. A "rollover" is a display that appears when a customer moves the cursor over an icon. Rollovers are used to provide optional features to the customer. Such optional features may include, for example, the ability to Open Application, Save to Your Documents, Email Document, or Learn More. The Open Application feature displays the document in a new window, similar to the View feature. Save to Your Documents displays a message telling the customer that the document has been added to Your Documents and provides a link to Your Documents. The Email Document feature opens up a new email message with the document as attachment. The Learn More feature opens up a new window containing information about the document.

In at least one embodiment, the CCEDS is accessible to customers through a bank's major website portal, with no security measures in place. In another embodiment, a link is emailed to an already-existing customer that provides the customer with secure access to the CCEDS. In still another embodiment, already-existing customers of the bank can securely log into the CCEDS on the bank's website. In still other embodiments, the customer may be able to access the CCEDS by any communication means such as in person in the bank lobby, by interactive voice response (IVR), phone, text messaging, mobile device, iris scan, fingerprint scan, or any other channel of communication.

In at least some embodiments, access to the CCEDS or initiation of a customer service interaction is presented strategically and dynamically to a customer as prompted by a trigger. As used herein, the term "trigger" refers to any action, behavior, threshold level or otherwise predefined feature that is correlated to specific customer service offerings. The trigger may be request-specific or action-specific. A request-specific trigger is a response to a direct inquiry from a customer. An action-specific trigger is a response to a customer action that is not a direct inquiry. Particular documents may be correlated with particular channels of communication. Thus, the bank may recommend a specific customer service channel of communication based on the particular document being referenced.

For example, if the customer asks for help in completing a particular document, the CCEDS directs the customer to a customer service representative who is an expert in the subject matter relevant to the document. In another example, a customer might complete and submit an application for a new checking account. The CCEDS may respond by alerting a customer service representative who is an expert in checking accounts, who could then contact the customer to follow up on the application.

In some embodiments, the CCEDS provides communication functions, such as email. The email function provided by the CCEDS is only used for correspondence between the customer and the bank. The email contains standard features such as an inbox folder, a sent items folder, a drafts folder, and a trash folder. Additionally, in some embodiments, the CCEDS email function provides more comprehensive communication features including a chat history folder, an email history folder, an alerts history folder, and a calendar function. Note that no emails or messages of any kind are sent by the bank to the customer's personal accounts, addresses, or mobile phones without the customer's permission and provision of the customer's contact information.

FIG. 2 is a system block diagram according to example embodiments of the invention. FIG. 2 actually illustrates two alternative embodiments of the invention. System 202 can be a workstation or personal computer. System 202 can be operated in a "stand-alone" mode. The system includes a fixed storage medium, illustrated graphically at 204, for storing programs and/or macros which enable the use of an embodiment of the invention. In a stand-alone implementation of the invention, fixed storage 204 can also include the data sets which are necessary to implement an embodiment of the invention. In this particular example, the input/output devices 216 include an optical drive 206 connected to the computing platform for loading the appropriate computer program product into system 202 from an optical disk 208. The computer program product includes a computer program or programs with instructions or code for carrying out the methods of the invention. Instruction execution platform 210 of FIG. 2 includes a microprocessor and supporting circuitry and can execute the appropriate instructions and display appropriate screens on display device 212.

FIG. 2 also illustrates another embodiment of the invention in which case the system 220 which is implementing the invention includes a connection to data stores, from which stored electronic documents 224, lists of actions 226, lists of customer service interaction triggers 228, and records of document actions 230 can be retrieved. The connection to the data stores or appropriate databases can be formed in part by network 222, which can be an intranet, virtual private network (VPN) connection, local area network (LAN) connection, or any other type of network resources, including the internet. Data sets can be local, for example on fixed storage 204, or stored on the network, for example in data store 224, 226, 228 or 230.

A computer program which implements all or parts of the invention through the use of systems like those illustrated in FIG. 2 can take the form of a computer program product 214 residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A computer-implemented method of providing a comprehensive coordinated electronic document system (CCEDS), comprising:
provasing a website portal, wherein a customer accesses the website portal, and wherein a financial institution stores at least one non-personalized electronic document and at least one personalized electronic document of the customer, wherein the non-personalized electronic document is selected from the group consisting of blank forms, informational documents, new account applications, transfers, payments, insurance documents, student center documents, tax documents, legal documents, disclosure statements, and agreements;
accessing a database comprising non-personalized electronic documents, at least one list of actions, at least one list of customer service interaction triggers, and at least one record of document actions;
providing access for the customer to the at least one non-personalized electronic document stored in the database;
determining, through the use of a processor, at least one action from the list of actions performed by the customer with regard to the at least one non-personalized electronic document, wherein the action consists of at least one of completing at least a portion of a blank form, submitting a form, performing a document search, adding notes to a document, saving a document, emailing a document, viewing a personalized document, and initiating a customer service interaction regarding a document, wherein the non-personalized electronic document becomes a personalized document after the customer takes the at least one action on the non-personalized document;
identifying a trigger from the list of customer service interaction triggers, wherein the trigger is associated with the action taken by the customer, and wherein the trigger is a predefined feature that is correlated to a customer service interaction;
initiating the customer service interaction between the customer and a specialized employee of the financial institution in response to the trigger, wherein the customer service interaction is routed to the specialized employee based on the personalized document, and wherein the customer and the specialized employee access the personalized document; and
creating a record of the at least one action taken, wherein the record comprises a link to a customer service history record for the customer service interactions pertaining to the personalized electronic document.

2. The method of claim 1, wherein the portal of the CCEDS comprises a secure environment.

3. The method of claim 1, wherein the at least one personalized electronic document comprises electronic documents in the categories of personal checking, personal savings, joint checking, mortgage account, personal credit card, corporate credit card, miscellaneous bank mail, and saved informational documents.

4. The method of claim 1, wherein the at least one personalized electronic document is selected from the group consisting of an account statement, a completed new account application, a completed insurance form, a completed student center form, a completed tax document, a completed legal document, a completed disclosure statement, and a completed agreement.

5. The method of claim 1, wherein the at least one action comprises at least one of the group consisting of completing a blank form, submitting a completed form, performing a document search, adding notes to a document, saving a document, emailing a document, and viewing a personalized document.

6. The method of claim 5, wherein performing a document search comprises at least one of performing the search based on the text of the document, the title of the document or the file name of the document, and performing the search based on key words assigned to the document.

7. The method of claim 1, wherein the trigger is a request-specific trigger or an action specific-trigger.

8. The method of claim 1, wherein the record organizes all available records into specifically defined categories, wherein the categories are defined based on the personalized document.

9. The method of claim 1, wherein the specialized employee and the customer take the action on a single personalized document.

10. A computer program product, the computer program product comprising a non-transitory medium with a computer readable program code embodied therein, the computer readable program code for execution by an instruction execution platform to implement a method of providing a comprehensive coordinated electronic document system (CCEDS), the method comprising:
   providing a website portal, wherein a customer accesses the website portal, and wherein a financial institution stores at least one non-personalized electronic document and at least one personalized electronic document of the customer, wherein the non-personalized electronic document is selected from the group consisting of blank forms, informational documents, new account applications, transfers, payments, insurance documents, student center documents, tax documents, legal documents, disclosure statements, and agreements;
   accessing a database comprising non-personalized electronic documents, at least one list of actions, at least one list of customer service interaction triggers, and at least one record of document actions;
   providing access for the customer to the at least one non-personalized electronic document;
   determining at least one action from the list of actions performed by the customer with regard to the at least one non-personalized electronic document, wherein the action consists of at least one of completing a blank form, submitting a completed form, performing a document search, adding notes to a document, saving a document, emailing a document, viewing a personalized document, and initiating a customer service interaction regarding a document, wherein the non-personalized electronic document becomes a personalized document after the customer takes the at least one action on the non-personalized document;
   identifying a trigger from the list of customer service interaction triggers, wherein the trigger is associated with the action taken by the customer, and wherein the trigger is a predefined feature that is correlated to a customer service interaction;
   initiating the customer service interaction between the customer and a specialized employee of the financial institution in response to the trigger, wherein the customer service interaction is routed to the specialized employee based on the personalized document, and wherein the customer and the specialized employee access the personalized document; and
   creating a record of the at least one action taken, wherein the record comprises a link to a customer service history record for the customer service interactions pertaining to the personalized electronic document.

11. The computer program product of claim 10, wherein the portal of the CCEDS comprises a secure environment.

12. The computer program product of claim 10, wherein the at least one personalized electronic document comprises electronic documents in the categories of personal checking, personal savings, joint checking, mortgage account, personal credit card, corporate credit card, miscellaneous bank mail, and saved informational documents.

13. The computer program product of claim 10, wherein the at least one personalized electronic document is selected from the group consisting of an account statement, a completed new account application, a completed insurance form, a completed student center form, a completed tax document, a completed legal document, a completed disclosure statement, and a completed agreement.

14. The computer program product of claim 10, wherein the at least one action comprises at least one of the group consisting of completing a blank form, submitting a completed form, performing a document search, adding notes to a document, saving a document, emailing a document, and viewing a personalized document.

15. The computer program product of claim 14, wherein performing a document search comprises at least one of performing the search based on the text of the document, the title of the document or the file name of the document, and performing the search based on key words assigned to the document.

16. The computer program product of claim 10, wherein the trigger is a request-specific trigger or an action specific-trigger.

17. The computer program product of claim 10, wherein the record organizes all available records into specifically defined categories, wherein the categories are defined based on the personalized document.

18. The computer program product of claim 10, wherein the specialized employee and the customer take the action on a single personalized document.

19. A system of providing a comprehensive coordinated electronic document functionality, the system comprising:
   an instruction execution platform operable for at least one comprehensive coordinated electronic document system (CCEDS) comprising a memory device with computer readable instructions stored thereon, and a processor operatively coupled to the memory device and configured to execute the computer readable instructions to:
   provide a website portal, wherein a customer accesses the website portal, and wherein a financial institution stores at least one non-personalized electronic document and at least one personalized electronic document of the customer, wherein the non-personalized electronic document is selected from the group consisting of blank forms, informational documents, new account applications, transfers, payments, insurance documents, student center documents, tax documents, legal documents, disclosure statements, and agreements;
   access a database comprising non-personalized electronic documents, at least one list of actions, at least one list of customer service interaction triggers, and at least one record of document actions;
   provide access for a customer to the at least one non-personalized electronic document;
   determine at least one action from the list of actions performed by the customer with regard to the at least one non-personalized electronic document, wherein the action consists of at least one of completing a blank form, submitting a completed form, performing a document search, adding notes to a document, saving a document, emailing a document, viewing a personalized document, and initiating a customer service interaction regarding a document, wherein the non-personalized electronic document becomes a personalized document after the customer takes the at least one action on the non-personalized document;

identify a trigger from the list of customer service interaction triggers, wherein the trigger is associated with the action taken by the customer, and wherein the trigger is a predefined feature that is correlated to a customer service interaction;

initiate the customer service interaction between the customer and a specialized employee of the financial institution in response to the trigger, wherein the customer service interaction is routed to the specialized employee based on the personalized document, and wherein the customer and the specialized employee access the personalized document; and create a record of the action, wherein the record comprises a link to a customer service history record for the customer service interactions pertaining to the personalized electronic document.

20. The system of claim 19, wherein the triggers for customer service interactions comprise at least one of the group consisting of request-specific triggers and action-specific triggers.

21. The system of claim 19, wherein the specialized employee and the customer take the action on a single personalized document.

22. An apparatus for providing a comprehensive coordinated electronic document functionality, comprising:

means for providing a website portal, wherein a customer accesses the website portal, and wherein a financial institution stores at least one non-personalized electronic document and at least one personalized electronic document of the user, wherein the non-personalized electronic document is selected from the group consisting of blank forms, informational documents, new account applications, transfers, payments, insurance documents, student center documents, tax documents, legal documents, disclosure statements, and agreements;

means for providing access by the customer to the at least one non-personalized electronic document within a comprehensive coordinated electronic document system (CCEDS);

means for determining at least one action from the list of actions performed by the customer with regard to the at least one non-personalized electronic document within the CCEDS, wherein the action consists of at least one of completing a blank form, submitting a completed form, performing a document search, adding notes to a document, saving a document, emailing a document, viewing a personalized document, and initiating a customer service interaction regarding a document, wherein the non-personalized electronic document becomes a personalized document after the user takes the at least one action on the non-personalized document;

means for identifying a trigger from the list of customer service interaction triggers, wherein the trigger is associated with the action taken by the customer, and wherein the trigger is a predefined feature that is correlated to a customer service interaction;

means for initiating the customer service interaction between the customer and a specialized employee of the financial institution in response to the trigger, wherein the customer service interaction is routed to the specialized employee based on the personalized document, and wherein the customer and the specialized employee access the personalized document; and means for creating in the CCEDS a record of the at least one action taken, wherein the record comprises a link to a customer service history record for the customer service interactions pertaining to the personalized electronic document.

23. The apparatus of claim 22, wherein the specialized employee and the customer take the action on a single personalized document.

* * * * *